INVENTORS
JOHN A. WATKINS
ELLIOT R. LANG
BY Weingarten,
Orenbuch &
Fahive
ATTORNEYS INVENTORS
JOHN A. WATKINS
ELLIOT R. LANG
BY Weingarten,
Orenbuch &
Lahive
ATTORNEYS

| DECIMAL DIGIT | BI-QUINARY CODE | | | | |
|---|---|---|---|---|---|
| | A | B | C | D | E |
| 0 | 0 | 1 | 0 | 0 | 1 |
| 1 | 1 | 1 | 0 | 0 | 0 |
| 2 | 1 | 0 | 1 | 0 | 0 |
| 3 | 0 | 1 | 1 | 0 | 0 |
| 4 | 0 | 1 | 0 | 1 | 0 |
| 5 | 0 | 0 | 1 | 1 | 0 |
| 6 | 0 | 0 | 1 | 0 | 1 |
| 7 | 0 | 0 | 0 | 1 | 1 |
| 8 | 1 | 0 | 0 | 1 | 0 |
| 9 | 1 | 0 | 0 | 0 | 1 |

April 29, 1969    J. A. WATKINS ET AL    3,441,927
ELECTROMAGNETIC INDICATOR WHEEL RESPONSIVE TO CODED ELECTRICAL
SIGNALS HAVING POSITIONING COILS ENERGIZED IN PAIRS
Filed May 28, 1965    Sheet 4 of 5

INVENTORS
JOHN A. WATKINS
ELLIOT R. LANG
BY Weingarten,
Ostrolenk &
Faber
ATTORNEYS INVENTORS
JOHN A. WATKINS
ELLIOT R. LANG
BY Weingarten,
Ouenluigh &
Lahive
ATTORNEYS United States Patent Office 3,441,927
Patented Apr. 29, 1969

3,441,927
ELECTROMAGNETIC INDICATOR WHEEL RESPONSIVE TO CODED ELECTRICAL SIGNALS HAVING POSITIONING COILS ENERGIZED IN PAIRS
John A. Watkins, Cheshire, and Elliot R. Lang, Hamden, Conn., assignors, by mesne assignments, to United-Carr Incorporated, Boston, Mass., a corporation of Delaware
Filed May 28, 1965, Ser. No. 459,575
Int. Cl. G08b 5/00, 23/00
U.S. Cl. 340—378                    2 Claims

ABSTRACT OF THE DISCLOSURE

An indicator has a rotor carrying symbols to be displayed in a window. The indicator's stator has diametrically disposed windings encircling an annular ferromagnetic core. Diametrical windings are connected in pairs and each pair can be separately energized by a coded electrical signal. The symbol to be displayed is selected by simultaneously applying a set of coded electrical signals to the pairs of windings to cause the establishment of a discretely oriented magnetic field externally of the core. A permanent magnet, which is part of the rotor, turns into alignment with the stator's field and positions the selected symbol in the window.

---

This invention relates in general to devices for converting coded electrical signals into a visible display. More particularly, the invention concerns an electromagnetic indicator arranged to respond directly to coded binary electrical signals by displaying a symbol corresponding to the value of the coded signals.

The conventional electromagnetic indicator which is capable of displaying the ten decimal symbols, i.e. 0, 1, 2, 3 . . . 9, employs a stator having ten electromagnets. Each electromagnet is arranged to be separately energized by an electrical signal and, in response to the electrical input, causes a different one of the decimal numerals to be displayed in a window of the indicator. As each electromagnet of the stator must be capable of separate electrical energization, the conventional decimal indicator has ten separate electrical inputs which must be coupled to the source of the electrical signals in a manner that causes the correct decimal symbol to be displayed.

In some applications where electromagnetic decimal indicators are employed, the electrical signals are coded according to the binary system. In a binary code, as the name indicates, each "bit" in the code can have but one of two values. In binary parlance, the two values are commonly designated ONE and ZERO; if the value of a bit is not ONE, it must be ZERO, as that is the only other permissible value. Where the code consists of a set of electrical signals, each signal of the set is a "bit" and must have either one of the two values. A binary ONE for example, can correspond to the presence of an electrical potential whereas the binary ZERO can correspond to the absence of an electrical potential.

The conventional ten input electromagnetic decimal indicator, when used in a situation where the electrical signals are coded in accordance with a binary system, requires the interposition of a decoding device to translate the binary signals into signals compatible with the input arrangement of the indicator. The invention's objective is to provide an electromagnetic indicator of simple construction that responds directly to coded binary signals so as to eliminate the need for an interposed decoding mechanism.

The invention resides in an electromagnetic indicator utilizing a stator which has windings mounted upon an annular ferromagnetic core. The windings are connected in pairs and arranged so that windings located on diametrically opposite positions on the core must be energized simultaneously. The direction of the magnetic flux set up in the core by one winding of the pair is counter to the direction of the magnetic flux set up in the core by the other winding, causing a magnetic field to be established externally of the core. That is, each pair of windings, when energized, has a magnetic circuit that extends outside the annular core. Each pair of windings, when energized, establishes an external magnetic field having an orientation that is different from the direction of the magnetic field set up by any other pair of windings on the core. When two or more pairs of windings are concurrently energized, the direction and magnitude of the external magnetic field is the resultant of the magnitudes and orientations of the magnetic fields established by each pair of windings. In the invention, the rotor of the electromagnetic indicator employs a permanent magnet secured to a drum. The permanent magnet is encircled by the stator's annular core and the rotor is mounted in a manner permitting the permanent magnet to turn until it is aligned with the external magnetic field established by the stator. The drum, being fixed to the permanent magnet, assumes a stationary position whenever the magnet is aligned with the stator's field and the maximum number of stationary positions assumed by the drum is, therefore, determined by the number of discretely oriented resultant magnetic fields that can be established by the stator. On the periphery of the drum, symbols are arranged in positions where a symbol is present in the window of the indicator when the permanent magnet is in an aligned position. For each aligned position of the permanent magnet, a different symbol can be displayed in the window.

The invention is particularly suited to respond directly to bi-quinary coded electrical signals. A bi-quinary code is a binary system consisting of five bits and the bi-quinary code requires that two of the bits shall have the same value. The bi-quinary code is sometimes referred to as a "two out of five code" because two of the bits must be different in value from the other bits in the code.

The invention, both as to its construction and mode of operation, can be apprehended from a study of the following exposition when considered in conjunction with the accompanying drawings in which.

Figure 1:
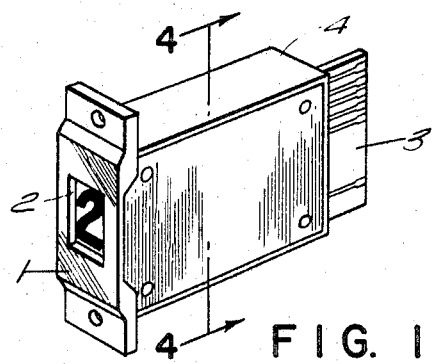
FIG. 1 depicts an embodiment of the invention in assembled form.

The indicator depicted in FIG. 1 of the drawings employs a front panel 1 having a window 2 in which symbols, such as numerals, are displayed. Electrical signals are impressed upon the indicator through the terminals of a printed circuit board 3 which extends from the rear of the indicator housing. The terminals of the printed circuit board, as shown in FIG. 2, are designated, A, B, C, D, E, and COMMON.

Figure 2:
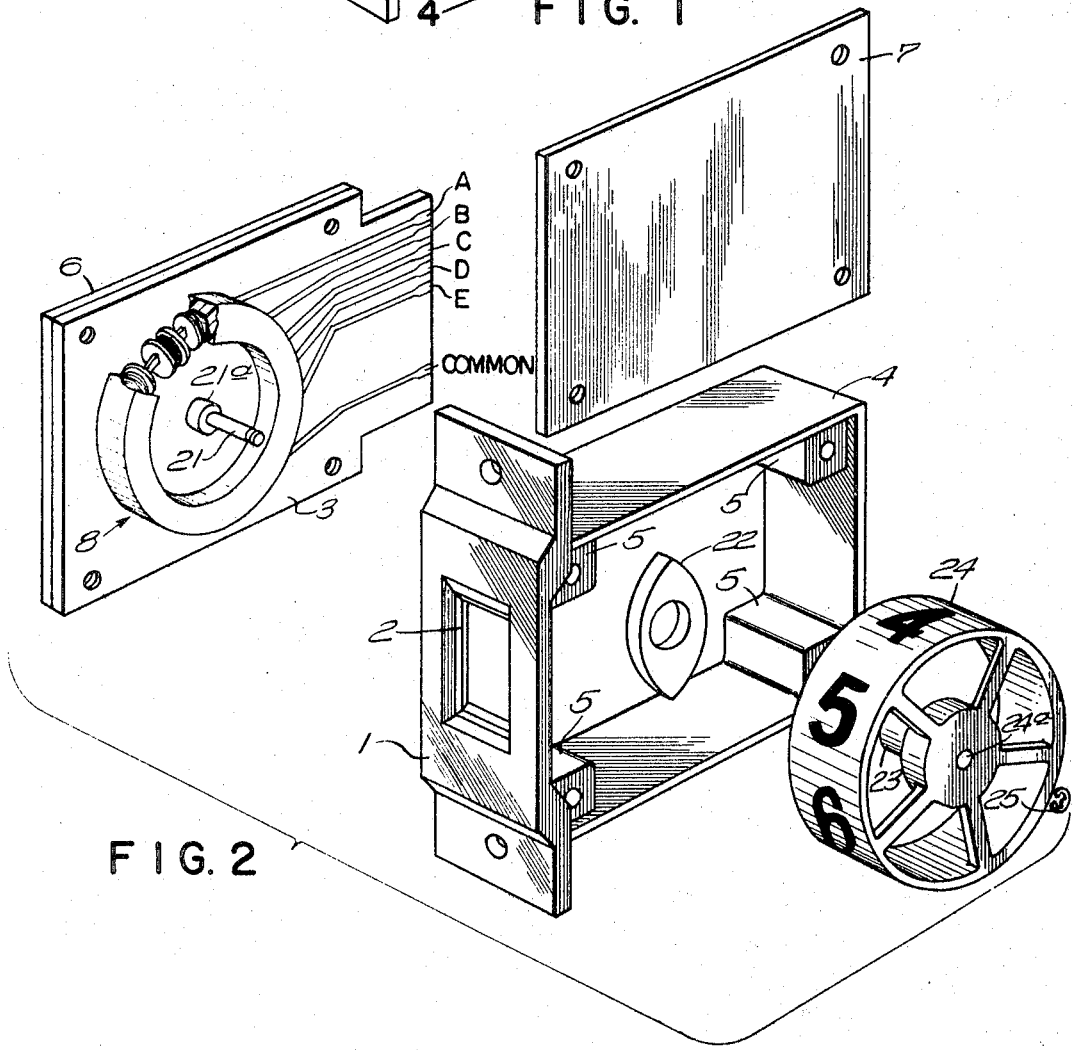
FIG. 2 is an exploded view of the embodiment showing its component parts.
Figure 3:
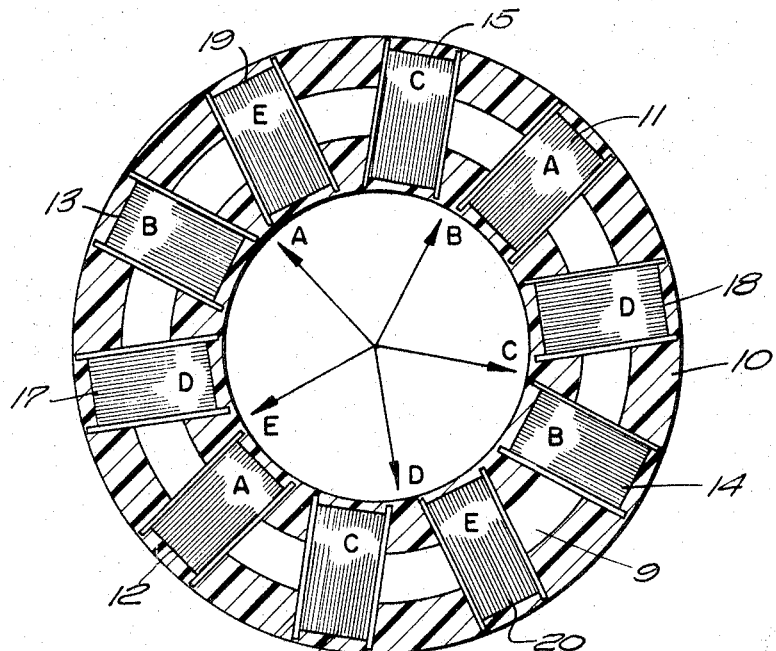
FIG. 3 depicts the arrangement of the windings on the core of the stator.
Figure 4:
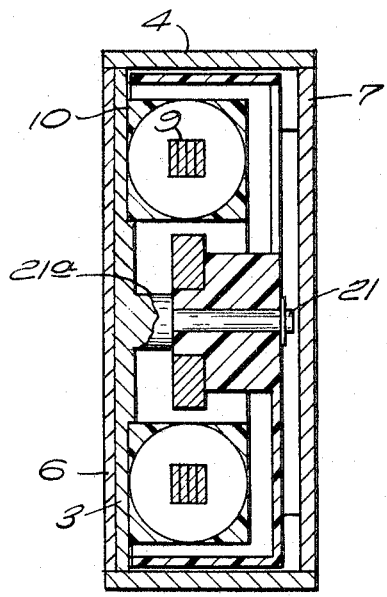
FIG. 4 is a sectional view of the embodiment taken along the plane 4—4 of FIG. 1.

The housing, as illustrated in FIG. 2, employs a hollow rectangular body 4 having posts 5 at its corners. The front panel 1, preferably is an integral part of the body 4. The posts are internally threaded and when the indicator is assembled, end plates 6 and 7 are secured to opposite sides of body 4 by screws which engage the threaded posts. Printed circuit board 3 has its wiring protected by an insulative coating and the board is preferably clamped against body 4 by end plate 6. As several indicators may be mounted side by side or an indicator may be used in an environment where external magnetic fields of appreciable strength are present, the end plates are, preferably, fabricated of a material of high magnetic permeability to act as magnetic shields. Secured to circuit board 3 is a stator 8 having a ferromagnetic core 9 carrying a plurality of electromagnetic windings. The core and its windings are preferably embedded or "potted" in a plastic matrix 10 which seals the electrical components against moisture and insures that the windings are rigidly held in place. The core 9 is preferably constructed as indicated in FIG. 4 of laminations for ease of manufacture. The core and its windings form a stator whose purpose is to establish any one of a plurality of discretely oriented magnetic fields. Ten electromagnetic windings 11, 12, 13 . . . 20 are symmetrically disposed around the core 9, as shown in FIG. 3, with each winding encircling a portion of the core. Diametrically opposite pairs of windings are connected in pairs in the manner schematically diagramed in FIG. 5.

Secured to circuit board 3 and extending through the geometric center of annular stator 8 is a shaft 21. In the assembled apparatus, a rotor is mounted to turn about the shaft. The rotor employs a permanent magnet 22 attached to the hub 23 of a drum 24. The periphery of the drum is marked with symbols that are to be displayed in the window of the indicator. Usually the symbols are alpha-numeric characters and are of a size permitting only one character at a time to be fully presented or "registered" in the window. For the purpose of exposition, the symbols in the preferred embodiment are assumed to be arabic numerals and all ten decimal numerals are assumed to be marked on the periphery of the drum. The permanent magnet is rigidly attached to the drum so that the two members constitute a rotor which turns as an integral unit. The drum has a central aperture 24a which permits the rotor to be mounted over shaft 21. When so mounted, the drum encircles the annular core whereas the magnet is within the enclosure of the annular core. To retain the rotor so that it cannot slip off the shaft, a groove is provided adjacent the shaft's end for accommodating a C-shaped lock member 25. The shaft has an enlarged portion 21a, as best shown in FIG. 4, which provides a shoulder against which the hub 23 bears to thereby position the rotor so that the permanent magnet is aligned with the core 9 of the stator.

Figure 7:
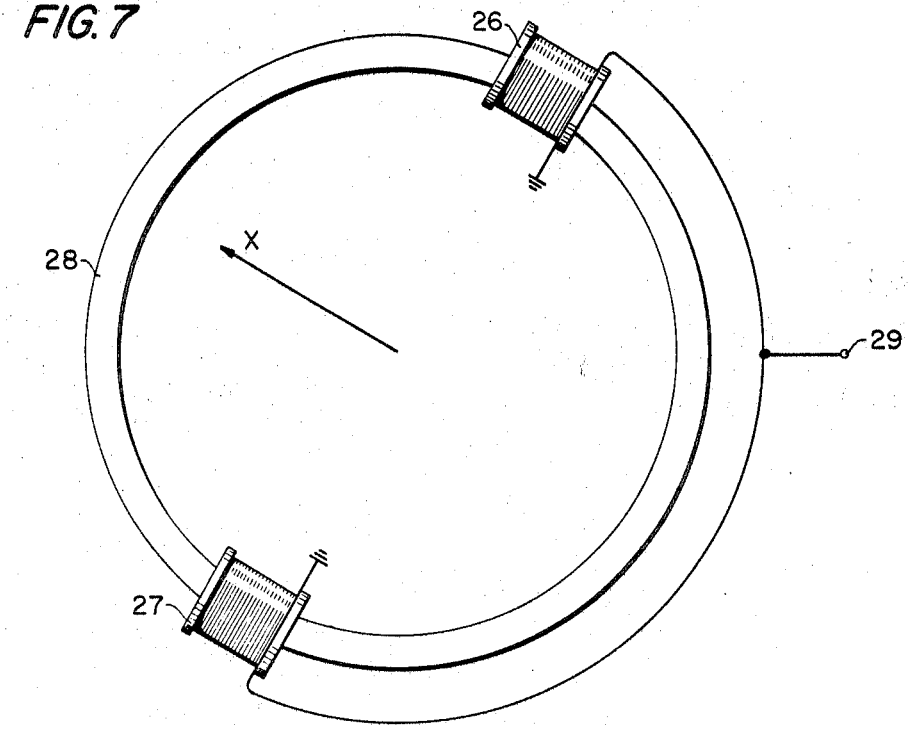
FIG. 7 illustrates a rudimentary stator employing a single pair of windings.
Figure 8:
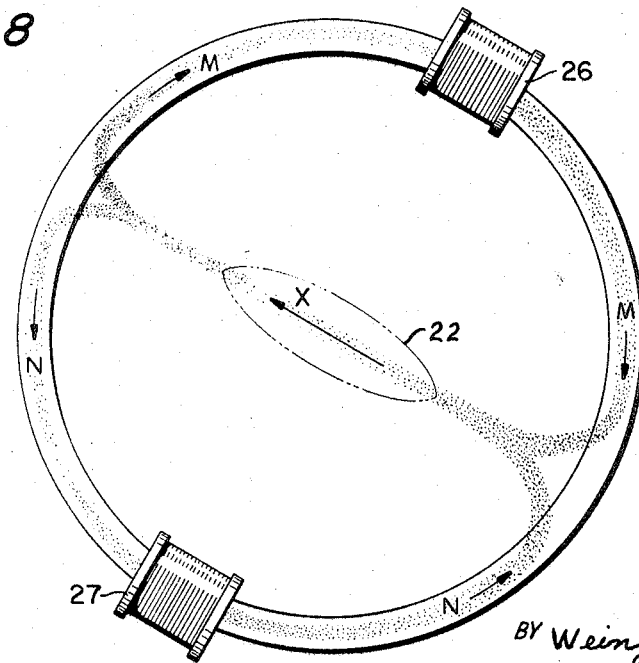
FIG. 8 shows the magnetic flux paths created by electrically energizing the single pair of windings.

FIG. 7 depicts a rudimentary stator having a pair of similar windings 26 and 27 disposed upon an annular ferromagnetic core 28. The windings are diametrically opposite one another and are arranged so that when an electrical signal is applied at terminal 29 both windings are electrically excited. Upon being electrically energized, winding 26 establishes a magnetic flux in the core whose direction is counter to the direction of the magnetic flux established by winding 27. That is, if the winding 26 causes its magnetic flux to flow clockwise as indicated by the M arrows in FIG. 8, then the magnetic flux established by the electrical current in winding 27 flows in the counterclockwise direction as indicated by the N arrows. Because of the directions of the fields established by winding 26 and 27, the magnetic flux is forced out of the core. The external magnetic field can be represented by a vector, such as the arrow X, whose direction is the direction of the external field and whose length is a measure of the external field's magnetic intensity. In the absence of any other external magnetic field, the permanent magnet of the rotor, indicated in phantom in FIG. 8, is constrained to rotate into alignment with the X vector. When so aligned, one of the symbols on the periphery of the drum is in register in the window of the panel 1.

Figure 9:
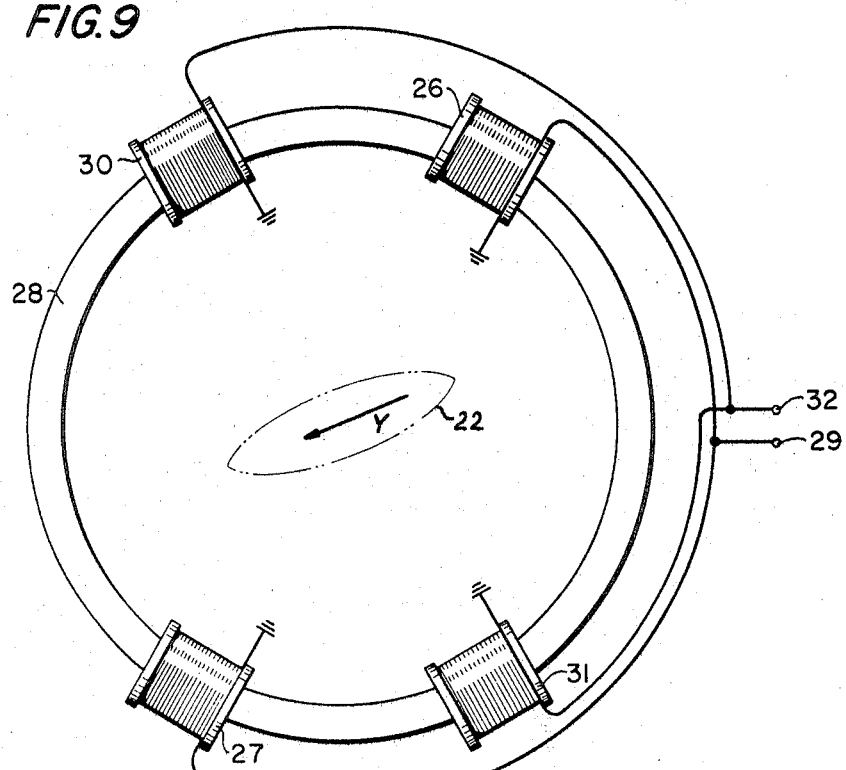
FIG. 9 depicts the rudimentary stator to which a second pair of windings have been added.
Figure 10:
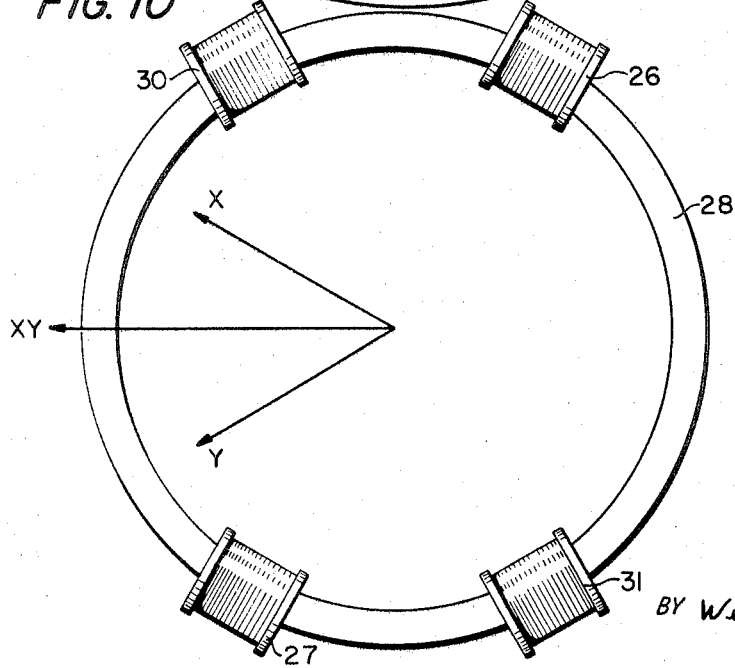
FIG. 10 illustrates the resultant magnetic field vector established by the simultaneous energization of both pairs of windings.

In the stator of FIG. 9, a second pair of diametrically opposed windings 30 and 31 have been added to the annular core 28. The additional windings are connected to terminal 32 so that both windings are simultaneously electrically energized by a signal applied at that terminal. When electrically energized by a signal applied at terminal 32, the external magnetic field established by windings 30 and 31 is represented by the vector Y. The magnitude of vector Y is assumed to be equal to the magnitude of vector X. The permanent magnet of the rotor will, when windings 30 and 31 are energized, rotate into alignment with vector Y and thereby bring another symbol on the drum into register in the window of the indicator.

Where electrical signals are simultaneously applied to terminals 29 and 32, the external magnetic field is represented by the resultant of vectors X and Y. In FIG. 10, the resultant is designated by the vector XY and bisects the angle between vectors X and Y because vectors X and Y are of equal magnitude.

FIG. 3 depicts the stator that is employed in an indicator constructed to respond directly to bi-quinary coded electrical signals. The stator has five pairs of windings, each pair of windings being connected in the manner of windings 26 and 27 of FIG. 7. For ease of exposition, windings 11 and 12 are designated as A windings and when energized, establish an external magnetic field represented by the vector A; windings 13 and 14 are designated B windings and when energized establish a magnetic field represented by vector B; windings 15 and 16 are designated C windings and when energized establish an external magnetic field represented by vector C; windings 17 and 18 are designated D windings and when energized, establish an external magnetic field represented by vector D; and when E windings 19 and 20 are energized, they establish an external magnetic field represented by vector E.

Figures 5, 6:
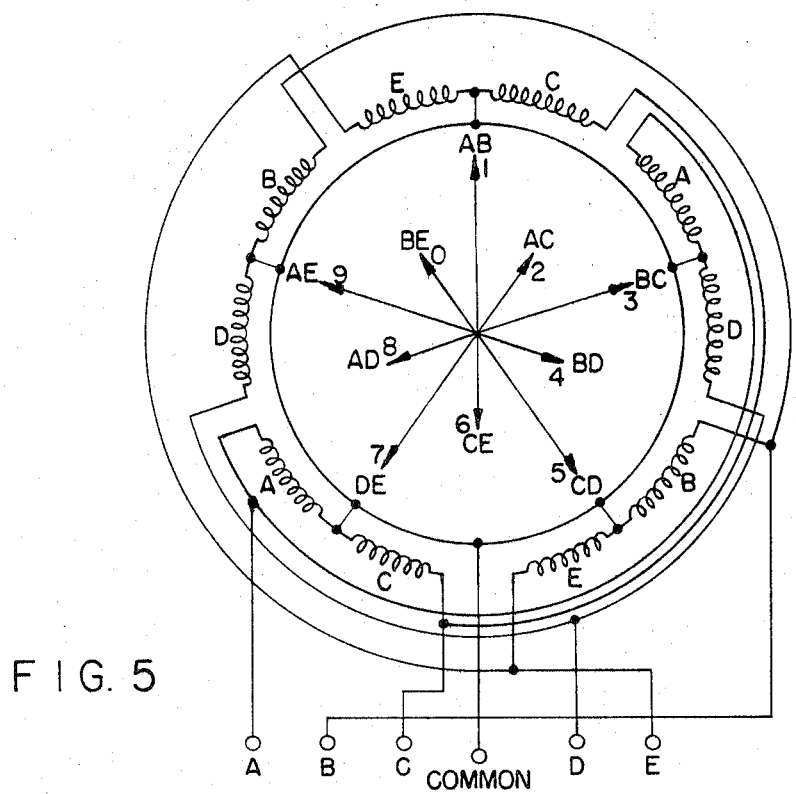
FIG. 5 depicts the scheme of the stator employed in the invention to accommodate bi-quinary coded electrical signals.
FIG. 6 tabulates the bi-quinary code with respect to its decimal equivalent value.

In the schematic arrangement illustrated in FIG. 5, the alphabetically designated windings A, B, C, D, E, are connected to the correspondingly designated terminals so that when an electrical signal is applied to terminal A, the A windings are energized; when an electrical signal is applied to terminal B, the B windings are energized; and so on. Each winding has one end connected to a common terminal and it is assumed that the signals applied at terminals A, B, C, D, E, are of the same electrical porality with respect to the common terminal. If the electrical signal applied to a terminal were reversed in polarity with respect to the common terminal, the direction of the corresponding vector would be reversed because the established magnetic field would be reversed in direction.

The stator of FIGS. 3 and 5 is particularly suited to cause the indicator to respond directly to bi-quinary coded electrical signals. A bi-quinary code is a binary system consisting of five bits and because the code requires that two of the bits shall have the same value, the bi-quinary code is sometimes referred to as a "two out of five code." That is, referring to FIG. 6 where the bits in the code are tabulated under the five columns headed A, B, C, D, E, for each decimal digit, two of the bits are valued ONE and the other three bits are valued ZERO. For example, the decimal digit 8 is represented in the bi-quinary code by having bits A and D valued at ONE and bits B, C, and E valued at ZERO. When the bi-quinary code is in the form of electrical signals, a bit having a value of ONE is customarily represented by a designated electrical voltage, for example +6 volts, whereas the value of ZERO is represented by the absence of electrical voltage.

To make the indicator respond directly to bi-quinary coded electrical signals, the bits under columns A, B, C, D, E of FIG. 6 are simultaneously applied to the corresponding terminals A, B, C, D, E of the FIG. 5 stator. To cause decimal digit 0 to be displayed by the indicator, for example, terminals B and E are electrically energized whereby the B and E windings establish an external magnetic field represented by the vector BE. The permanent magnet of the rotor is constrained to rotate into alignment with vector BE and when so aligned, the numeral 0 on the drum 24 is registered in the window of the indicator. The numeral 0 will remain in the window so long as terminals B and E are energized and terminals A, C and E are unenergized. Where the set of electrical signals applied to the terminals of the FIG. 5 stator is such that terminals A, B are energized and terminals C, D, E are unenergized, the stator causes an external magnetic field to be established which is represented by the vector AB. The rotor, under the influence of the external magnet field then assumes a position where the decimal digit 1 is in register in the window.

By suitably energizing two of the terminals A, B, C, D, E of the FIG. 5 stator, any one of the ten discretely oriented magnetic field vectors AB, AC, BC, BD, CD, CE, DC, AD, AE, BE can be established. Each of the ten magnetic field vectors is associated with a different decimal digit on the drum so that any one of the ten decimal digits can be brought into the window of the indicator. The indicator, when utilizing the stator of FIG. 5, therefore, responds to binary coded electrical signals without requiring the interpositon of a decoding mechanism.

Where it is desired to provide the indicator with a "memory" so that the stator need not be continuously energized in order to have a symbol in register in the window, use can be made of the static magnetizable elements disclosed in Patent No. 2,943,313 granted to B. M. Gordon et al. By employing the cylinder 71 and the ten magnetizable elements 73 shown in FIG. 3 of the Gordon et al. patent, the rotor of the indicator can be held in a position where the symbol is in register in the window when the electrical signals applied to the stator windings are discontinued. That is, where the static magnetizable elements are used, the elements are positioned to pull the rotor to an offset position, as taught by the patentees, when the stator is subsequently electrically de-energized. The provision of static magnetic elements permits the coded binary signals to be pulses which need persist only for the time required for the rotor to align itself with the magnetic field established by the stator. The symbol last registered in the window will, then, remain in the window until a new set of coded signals causes a change in the display.

While the preferred embodiment of the invention has been described as using a stator employing five pairs of windings arranged symmetrically about the annular ferromagnetic core, it is apparent that the number of pairs of windings can be increased or decreased to accord with the coding system that is used for the electrical signals. Further, the pairs of windings need not be symmetrically arranged around the core, as it is evident that the symbols on the drum can be located to register properly in the window though an asymmetrical arrangement of windings is used.

It is preferred, for simplicity in manufacture, to employ windings that are similar in construction; that is, windings having the same number of turns of wire of the same gauge. To those familiar with the science of electromagnetism, it is obvious that windings of different construction can be used and arranged around the core in pairs so as to establish the desired orientations of the external magnetic fields. Further, while each pair of windings is depicted as electrically connected in parallel, it is obvious that the windings of a pair can be serially connected without altering the operation of the indicator.

The windings can be arranged upon the core so that no magnetic field vector is 180° displaced from any other magnetic field vector. With that disposition of windings, a turning force will always arise, when a new symbol is to be displayed, to constrain the rotor to turn into the new position; that is, because the rotor is never required to turn from one position to another position that is 180° away, there is no tendency for the rotor to "hang up" because of negligible torque. Where an indicator is constructed with that arrangement of windings and the static magnetic elements of the Gordon et al. patent are employed to provide a "memory," the elements are positioned not to pull the rotor to an offset position, as taught by the patentees, but rather, are positioned to hold the rotor in the vector aligned position when the stator is subsequently electrically de-energized. This construction eliminates the "blink" that is characteristic of the Gordon et al. arrangement. That is, in the Gordon et al. indicator, when the stator is electrically energized, the symbol appears in an off-centered position as indicated in FIG. 6B of the Gordon et al. patent; when that stator becomes electrically de-energized, the symbol moves into register in the window as shown in FIG. 7B. The slight movement from one position to the other of the symbol causes a "blink."

As illustrated in the drawings, permanent magnet 22 is an elongate member having pointed salient poles on its longitudinal axis. The salient poles tend to concentrate the magnetic flux and define sharply the north and south magnetic poles of the permanent magnet. The pointed ends constitute "salient" poles of the magnet in the sense that the magnetic field is most intense in the immediate vicinity of two diametrically opposite points on the magnet. While magnet 22 is preferably of the illustrated shape, it may take other forms without materially affecting the manner of the indicator's operation. For example, the permanent magnet may be a rectangular bar magnet having wedge shaped ends. The permanent magnet may even be circular in form and have soft iron rods attached to it at diametrically opposite locations to concentrate the magnetic flux and define the north and south magnetic poles.

What is claimed is:
1. In an electromagnetic indicator of the type utilizing
   a stator having electrically energizable windings mounted upon and annular ferromagnetic core for selectively establishing a plurality of discretely oriented magnetic fields, each winding encircling a portion of the core, and
   a rotor having a salient pole magnet mounted to pivot within the annular core whereby the magnet rotates into alignment with the magnetic field established by the stator,
the improvement whereby the indicator responds to a set of simultaneous electrical signals, the electrical signals being coded in accordance with a binary system so that each signal in the set represents one bit in the binary code, the improvement residing in
   a plurality of terminals provided to accommodate the set of simultaneous electrical signals,
   the windings being connected in pairs to cause both windings of the pair to be simultaneously energized by an electrical signal, each energized pair of windings being arranged to establish a discretely oriented magnetic field externally of the core, and
   the pairs of windings being connected to the plurality of terminals so that each electrical signal of the set is applied to a different pair of windings.
2. In an electromagnetic indicator of the type utilizing
   a stator having electrically energizable windings mounted upon an annular ferromagnetic core, the stator serving to establish a plurality of discretely oriented external magnetic fields, each winding encircling a different portion of the core, a rotor having a salient pole magnet mounted to pivot within the annular core whereby the magnet rotates into alignment with the discrete magnetic field established by the stator, the rotor including a drum having symbols marked on its periphery, and a panel having a window in which the symbols are displayed, the improvement whereby the indicator responds directly to a set of simultaneous electrical signals, the eletcrical signals being coded in accordance with a binary system so that each signal in the set represents one bit in the binary code, the improvement residing in providing a plurality of terminals to accept the entire set of simultaneous electrical signals, having the windings spaced around the core so that each winding is diagonally opposite another winding, diagonally opposite windings being connected in pairs to cause both windings of the pair to be simultaneously energized by an electrical signal, each energized pair of windings establishing a discretely oriented magnetic field externally of the core, and the pairs of windings being connected to the plurality of terminals so that each electrical signal of the set is applied to a different pair of windings.

References Cited

UNITED STATES PATENTS

| | | | |
|---|---|---|---|
| 2,908,900 | 10/1959 | Gordon et al. | 340—325 X |
| 2,943,313 | 6/1960 | Gordon et al. | 340—325 X |

JOHN W. CALDWELL, *Primary Examiner.*

H. I. PITTS, *Assistant Examiner.*

U.S. Cl. X.R.

340—325